United States Patent Office 3,699,079
Patented Oct. 17, 1972

3,699,079
CARBON DIOXIDE-DIEPOXIDE COPOLYMERS
Peter Haynes, Berkeley, Calif., assignor to Shell Oil
Company, New York, N.Y.
No Drawing. Filed Aug. 11, 1970, Ser. No. 63,031
Int. Cl. C08g 30/04
U.S. Cl. 260—47 EP
10 Claims

ABSTRACT OF THE DISCLOSURE

A process for copolymerizing one or more diepoxide compounds with carbon dioxide in the presence of a catalytic amount of a composite catalyst comprising an organo-metallic compound of magnesium, zinc, or cadmium, and one or more compounds from the group of polar organic nitro-, nitroso-, azoxy, amine, thiol and sulfoxide compounds and water is disclosed. The resulting products are useful in films and moldings.

This invention relates to a process for copolymerizing diepoxide compounds with carbon dioxide and to the products resulting therefrom. It is known that carbon dioxide may be polymerized with monoepoxide compounds such as ethylene oxide, propylene oxide and styrene oxide. However, these polycarbonates have not achieved any technical importance, in the area of films or thermoplastic molding compositions. Further, it is known from the copending patent application of C. G. Hull and J. Boor filed of even date herewith that high molecular weight, substantially alternating copolymers of carbon dioxide and an aliphatic 1,2-monoepoxide may be produced in the presence of a catalyst system comprising an organo-metallic compound of magnesium, zinc or cadmium, amine and water.

In a broad aspect the present invention is directed to a process for copolymerizing diepoxide compounds in the presence of a catalytic amount of a composite catalyst comprising an organo-metallic compound of magnesium, zinc, or cadmium and a modifier of one or more compounds from the group of intro-, nitroso-, azoxy, amine, thiol and aliphatic sulfoxide compounds and water, for a period of time sufficient to produce useful polymeric products. The average molecular weight of the resulting polymers can range from about several hundred to several hundred thousand, for example, from about 900 to about 750,000 and higher. The various copolymers (the term copolymer herein refers to polymeric products of one or more diepoxide with carbon dioxide) prepared by the practice of the instant invention are highly useful products having a high degree of utility and application in moldings, coatings, films and related fields.

The diepoxides that can be copolymerized in the process of this invention are polyepoxides having about two oxirane groups per molecule. For clarity, a polyepoxide containing from about 1.6 to 2 oxirane groups is included herein as a diepoxide. The diepoxide may be saturated or unsaturated, aliphatic, cycloaliphatic, aromatic or heterocyclic and may be substituted with a non-interfering substituent such as chlorine, alkoxy groups, etc. They may be monomeric or polymeric.

The diepoxide compounds may be exemplified by the following: butadiene dioxide 1,4-bis(2,3-epoxypropoxy) benzene; dipentene dioxide 1,3-bis(2,3-epoxypropoxy) benzene; 4,4'-bis(2,3-epoxypropoxy diphenyl)ether; 1,8-bis(2,3-epoxypropoxy)octane; 1,4-bis(2,3-epoxypropoxy) cyclohexane; 4,4'-bis(3,4-epoxybutoxy)diphenyl dimethyl methane; 1,3-bis(4,5-epoxypentoxy)-5-chlorobenzene; 1, 4-bis(3,4 - epoxybutoxy)-2-chlorocyclohexane; diglycidyl ether; isoprene dioxide; 1,2 divinyl cyclobutane diepoxide; 1,2,5,6-diepoxy hexane, 1,2,5,6-diepoxy cyclooctane, epoxidized soybean oil; N,N'-diglycidyl aniline, etc.

Other examples include the glycidyl polyethers of dihydric phenols obtained by reacting a dihydric phenol with a great excess, for example, 4 to 10 mole excess of a halogen containing epoxide in an alkaline medium. Thus polyether A as described in U.S. 2,633,458 to Shokal which is a concentrate of 2,3-bis(2,3-epoxypropoxyphenyl)propane is obtained by reacting bisphenol A (2,2-bis (4-hydroxyphenyl)propane) with an excess of epichlorohydrin. Other dihydric phenols that can be used for this purpose include resorcinol, catechol, hydroquinone and methyl resorcinol. Also included are epoxy alkyl ethers of dihydric alcohols which may be prepared by reacting a diol, for example, ethylene glycol or butane 2,3 diol with a halogen-containing epoxide, usually epichlorohydrin, in the presence of a Lewis acid catalyst, e.g., $BF_3$. The resulting product, substantially a bis-chlorohydrin, is then converted to the diepoxide ether by dehydrochlorination with a base such as sodium hydroxide and recovering the diepoxide ether so made. Additional diglycidyl ethers may be formed by reacting, for example, polyoxypropylene glycol of selected molecular weight with epichlorohydrin in the presence of a suitable catalyst and subsequently dehydrochlorinating with accompanying oxirane closure. The polymeric diepoxide compounds may have from 2 to about 10 monomer units.

Another group of suitable diepoxides are the diepoxyalkyl esters of dicarboxylic acids. The epoxyalkyl groups are preferably normal alkyl groups of 3–7 carbon atoms, and most preferably identical groups of 3–5 carbon atoms each. Exemplary are the di-2,3-epoxy propyl esters of phthalic acid, the diglycidyl esters of hydrogenated phthalic acids, e.g., hexahydrophthalic acid, the di-2,3 epoxypropoxy ester of bicyclo [2,2,1]-5-heptane, 2,3 dicarboxylic acid and the diepoxybutyl ester of bicylo [2,2,1] heptane, 2,3 dicarboxylic acid. In one embodiment the monomeric diepoxides employed in the polymerization process of this invention can be characterized by the following formula:

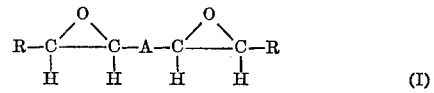

(I)

wherein A is a divalent organic radical from the group consisting of (1) 2 to 4 continuously linked atoms,
(2) Diester groups of a dicarboxylic acid having the carboxylic acid groups attached to adjacent carbon atoms of the acid, and
(3) A dialkyl ether of a dihydric compound having the ether groups attached to adjacent carbon atoms of the dihydric compound; and R, which may be the same or different, is hydrogen or an alkyl radical containing up to 16 carbon atoms. Illustrative R radicals include among others methyl, ethyl, n-propyl, isopropyl, n-butyl, sec-butyl, t-butyl, amyl, the hexyls, the heptyls, the octyls, the dodecyls, cyclopentyl, 2-propyl, cyclohexyl, 2-methylcyclohexyl, cycloheptyl and the like. It is preferred that each R individually be hydrogen or lower alkyl. Cycloalkyl and lower alkyl substituted cycloalkyl radicals which have from 5 to 7 carbon atoms in the cycloaliphatic nucleus are also preferred. Especially preferred are those diepoxide compounds wherein at least one R is hydrogen.

Another preferred group of diepoxides with reference to the formula are those wherein A contains a hetero atom selected from nitrogen, oxygen, phosphorus and sulfur. Among the hetero atom-containing diepoxides which can be utilized in the process of the invention are diglycidyl ether, N,N'-diglycidyl aniline; diglycidyl sulfide; diglycidyl phosphine; diglycidyl monoalkyl phosphines wherein the alkyl group contains up to 8 carbon atoms, e.g., diglycidyl butyl phosphine; diglycidyl monoaryl phosphine, e.g., diglycidyl phenyl phosphine, diglycidyl amine, diglycidyl mono alkylamines such as diglycidyl ethyl amine, diglycidyl cyclohexylamine and the like.

The organo metallic compounds of a Group II metal which can be used as a catalyst component for the preparation of aliphatic (which term here includes cycloaliphatic) polycarbonates in accordance with the invention can be characterized by the following formula:

wherein M represents a Group II metal in the Periodic Table from the group of magnesium, zinc or cadmium and Y which may be similar or dissimilar, represents a monovalent hydrocarbon radical, hydrocarbyloxy or halogen radical. Zinc and cadmium are preferred.

The monovalent hydrocarbon radicals are of any type including aliphatic, aromatic and alicyclic radicals as exemplified by alkyl, cycloalkyl, aryl, alkaryl and the like. Illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, benzyl, phenylpropyl, trimethylphenyl, and the like. Exemplary hydrocarbyloxy radicals include, for example, alkoxy, aryloxy, cycloalkyloxy, and the like, e.g., methoxy, ethoxy, isopropoxy, n-propoxy, t-butoxy, hexoxy, 2-ethylhexoxy, octoxy, decoxy, dodecoxy, phenoxy, butylphenoxy, benzyloxy, cyclohexyloxy, and the like.

Exemplary halogens are chlorine and bromine or iodine.

The catalyst modifier, or activator, may be one or more compounds from the group of polar organic nitro-nitroso-, azoxy, amine, thiol and sulfoxide compounds and water. Exemplary are nitromethane, nitroethane, nitropropane, nitrobenzene, phenyl nitromethane, nitrosobenzene, N-nitrosodimethylamine, methanethiol, butylthiol, dimethylsulfoxide and the like. The modifier compounds preferably contain less than 18, more preferably less than 13 carbon atoms.

Preferred is an amine modifier selected from the group of primary, secondary and tertiary amines, which includes heterocyclic compounds containing nitrogen in the ring. Exemplary amines include: aliphatic, cycloaliphatic, aliphatic-aromatic amines, for example, alkylamines, e.g., allylamine, diallylamine, triallylamine and methallylamine, alkylenediamines, alkylene polyamines, and their derivatives such as oxyalkylamines and amino acids, cyclohexylamine, dicyclohexylamine, benzylamine, phenylisopropylamine, aniline, toluidines, diphenylamine, methylaniline and N,N'-dimethylaniline.

The mole ratio of the components of the composite catalyst may vary within wide limits depending to some extent upon the selected organo metallic compound, the particular modifier or combination thereof, the diepoxide to be compolymerized, the diluent, if any, and the selected reaction temperature. Generally, the mole ratio of the modifier or combination of one or more modifier is in the range of 0.01 to 2, preferably 0.1 to 1.4 moles per mole of organo metallic compound.

The catalysts are employed in catalytically significant quantities. The particular di-epoxide(s) employed, the operative conditions under which the copolymerization is conducted, and other factors will largely determine the desired catalyst concentration. In general, a catalyst concentration in the range of from about 0.001 and lower to about 10% by weight based upon the monomeric feed is suitable. A catalyst concentration in the range of from about 0.01 to about 5.0% by weight is preferred.

The polymerization reaction can be conducted over a wide temperature range. Depending upon various factors such as the nature of the particular diepoxides employed, the particular catalyst employed, the concentrations of the catalyst and the like, the reaction temperature can be as low as −20° C. and as high as about 200° C. A reaction temperature in the range from 0° to 150° C. is preferred. Reaction pressures suitably vary within wide limits, e.g., from atmospheric pressure and below to 200 atmospheres or higher.

The copolymerization reaction may be carried out in the presence of an inert normally-liquid organic vehicle. Suitable inert solvents for the preparation of the polycarbonates are, for example, hydrocarbons including aliphatic, cycloaliphatic hydrocarbons such as n-hexane, cyclohexane, n-heptane, petroleum ether, and the like, aromatic hydrocarbons such as benzene, toluene, and the like, oxygen-containing solvents particularly ethers such as dioxane, diethyl ether, diisopropyl-ether and the like, halogenated hydrocarbons such as methylene chloride, carbon tetrachloride, chlorobenzene, and mixtures thereof.

The process of the invention can be executed in a batch, semicontinuous or continuous fashion.

The polymers of this invention are a useful class of polycarbonate compounds. They are generally white, sometimes ranging to a yellow or yellow-brown depending upon the purity of the reactants and the reaction conditions employed. As indicated previously, the number average molecular weights of the polycarbonate products can range from about several hundred to about several hundred thousand, for example from about 900 to about 750,000 and higher. The number average molecular weight and properties of the polymers will depend in main on the choice of the diepoxide and catalyst; the concentration of the catalyst, the operative conditions employed, e.g., temperature, the purity of the monomeric reagent(s) and catalyst, the use of the amount of an inert normally-liquid organic vehicle and the like. By controlling reaction conditions, the amount in-chain carbonate groups, i.e., linkages, within the resulting polymeric product may be varied from about 25% to about 99% of the total linkages corresponding to 25 to 99% wt. polycarbonate (the remaining linkages consist essentially of linear ether groups). That is to say that the polymer may contain ether groups, i.e., $\text{\{O\}}$ in place of carbonate groups, i.e.,

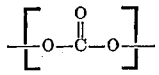

in an amount of between 1% and about 75% on the total number of linking groups, which linking groups are selected from carbonate groups and ether groups. Polymers of more than 50% polycarbonate, especially above 75% wt. polycarbonate are preferred. The polymers can range from viscous liquids to extremely tough crystalline solids. The very viscous liquids to wax-like products of relatively low molecular weight are useful in the preparation of cosmetics, polishes, waxes; as thickening agents and dispersants for various lubricants, and plasticizers for polymeric compositions. The polymers can be employed in the treatment of fibrous materials, for example, as sizing agents, or as antistatic agents. They can also be employed as protective coatings and impregnants. The solid polymers are useful for the production of various shaped articles such as, for example, buttons, handles, bottles, toys and the like. The polymers are also useful as plasticizers in other polymers, for example, resins.

An advantage afforded by the practice of the invention is the preparation of terpolymers whose physical characteristics can be tailor-made to fit desired uses in a variety of fields of application, that is, by adjusting the concentration of admixture of diepoxide monomers charged to a particular system copolymers, terpolymers, etc., can be prepared with a wide spectrum of properties and characteristics, for example, from soft elastomeric polymers to thermosetting polymers. They can be used as such or can be compounded with additives such as fillers, pigments, dyes, lubricants, other resins and the like.

In a preferred embodiment the invention also contemplates the preparation of novel polycarbonates containing in-chain monocyclic ethers which result from the polymerization of one diepoxide or anadmixture of at least two different diepoxides characterized by Formula I. The novel linear polycarbonates prepared therefrom are characterized by recurring units of the structural formula:

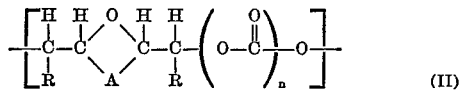

(II)

wherein A and R have the values set forth in Formula I, $n$ is 0 or 1, and $n$ is 1 in 25 to 99% of the recurring units. Preferably $n$ is 1 in more than about 50% of the recurring units corresponding to greater than 50% polycarbonate. Especially preferred are polymers where $n$ is greater than 1 in more than 75% of the recurring units.

The novel linear polycarbonates encompassed by the scope of this formula are further characterized by their inherent viscosity in the range from about .01 to about 7 or higher, and preferably about .02 to about 5.

The polymers of this invention may be cast in the films or dry spun in filamentary form from solution. Films and filaments may also be prepared by techniques well known in the art. For a clear understanding of the invention the following specific examples are given. These examples are intended to be merely illustrative of the invention and not in limitation thereof. Unless otherwise indicated, parts and percentages are expressed on a weight basis. Inherent viscosity $\eta(\text{inh})$ has been determined in accordance with the following equation:

$$\eta_{(\text{inh.})} = \frac{\ln \eta_{\text{rel.}}}{C}$$

the relative viscosity ($\eta_{\text{rel.}}$) may be determined by dividing the flow time in a capillary viscometer of a dilute solution of the polymer by the flow time for the pure solvent. The concentration (C) used in examples is 0.3 gram of polymer per 100 milliliters (ml.) of solution and the measurements are made at 23° C. unless otherwise specified. In the following examples all volumetric amounts are at room temperature, i.e., 23° C.

EXAMPLE I

A stainless steel reaction vessel equipped with mechanical stirrer and having a capacity of 80 ml. was dried at a 130° C. with dry nitrogen and charged with 25 ml. of toluene, a solution of 14 millimoles (mm.) of diethyl zinc in 9 ml. heptane, 0.5 ml. of a premixture of cyclohexylamine and water in a ratio of 0.7 mole of amine to 1.0 mole of water and 15 grams of 1,2,5,6-diepoxyhexane. The vessel was charged with carbon dioxide from a source to maintain a constant pressure of 750 p.s.i.g. and heated to 100° C. for 19 hours. After cooling, the reaction vessel was opened and found completely filled with a white solid. The total solid was dissolved in a mixture of 25 parts toluene and 200–300 parts methanol and the solvent evaporated to obtain 10.7 grams of a waxy solid, having an inherent viscosity in methylethyl ketone of about 0.04. Infrared analyses indicated the chemical structure of the product had greater than 25% carbonate content. The polymer was soluble in methanol, toluene and methyl ethyl ketone.

EXAMPLE II

The procedure of Example I was repeated except that the 1,2,5,6-diepoxyhexane was replaced with 15 grams of diglycidyl ester of orthophthalic acid, the carbon dioxide pressure was 700 p.s.i.g., and the polymerization time was 17.5 hours. The resulting copolymer product was precipitated into methanol containing concentrated hydrochloric acid, agitated to effect catalyst removal, rinsed with additional methanol, and finally dried under vacuum at a temperature of 60° C. to produce 18.2 grams of product having a wide melting range from about 158 to 280° C. The copolymeric product was amorphous to X-ray diffraction and insoluble in such polar solvents as dimethylformamide, tetrahydrofuran, propylene carbonate, chloroform and toluene. The copolymer could be pressed into a clear film and molded into a transparent bar. Carbon hydrogen analysis indicated that copolymer contained more than about 90% carbonate.

EXAMPLE III

The procedure of Example I was repeated except that the 1,2,5,6-diepoxyhexane was replaced with 13.3 grams of 1,2-divinylcyclobutane diepoxide and the polymerization time is 22 hours. The white solid polymeric product was worked up in acidified methanol according to the procedure of Example II to obtain 7.3 grams of methanol insoluble product. The infrared spectrum of this material showed carbonate content greater than 25% w.

EXAMPLE IV

The procedure of Example I was repeated except that the 1,2,5,6-diepoxyhexane was replaced with 10 grams of a highly crystalline diglycidyl ester of bisphenol A having an epoxide value of 98.3% of theoretical, and the polymerization time was 22 hours. The resulting copolymer product was precipitated into methanol containing concentrated hydrochloric acid, agitated to effect catalyst removal, rinsed with additional methanol and finally dried under vacuum at a temperature of 60° C. to yield 12 grams of a free-flowing white powder. The copolymer, which could be pressed into partially clear films, had greater than about 50% carbonate by infrared analysis. The copolymer was found to be insoluble in a wide variety of solvents, including toluene, methyl ethyl ketone, acetone, propylene carbonate, dimethylformamide.

EXAMPLE V

The procedure of Example I was repeated except that the 1,2,5,6-diepoxyhexane was replaced with 20 grams of epoxidized soybean oil having a viscosity at 25° C. of 320 centipoises and an oxirane oxygen content of 7.25%; the carbon dioxide pressure was 780 p.s.i.g., and the polymerization time was 18 and one quarter hours. The resulting copolymer product was worked up as described in the foregoing example, to obtain 6.70 grams of methanol insoluble solid product and 16.9 grams of a methanol soluble product.

(b) The above procedure was repeated except that no carbon dioxide was applied. The resulting product was only a viscous liquid. Comparison of the infrared spectrum of the insoluble product prepared employing carbon dioxide with the product of the experiment not utilizing carbon dioxide showed that the carbon dioxide polymer had an additional absorption band at 5.6 microns and several differences in the finger-print region from 7.4 to 11.1 microns.

EXAMPLE VI

The procedure of Example I was repeated except that the 1,2,5,6-diepoxyhexane was replaced with 15 grams of N,N'-diglycidylaniline having an epoxide content of 0.95 per 100 grams, and the polymerization time is 17.5 hours. The copolymer product was worked up according to the procedure of Example II to obtain 11.26 grams, i.e., about 63% of the theoretical yield, of a white free-flowing powder. The copolymer product, which could be pressed into clear film, had an inherent viscosity in dimethylformamide of 0.07. The polymer exhibited a glass transition temperature, by polarization microscope, of 62° C. X-ray diffraction shows the polymer to be at least 50% crystalline. Infrared analysis showed the polymer was greater than 50% poly carbonate. The polymer was only partially soluble in tetrahydrofuran. Gel-permeation chromatographic analysis of the polymer showed a wide range of molecular weights distributed about a number average molecular weight of about 3,000.

I claim as my invention:

1. A process which comprises contacting carbon dioxide with one or more diepoxide compounds containing from about 1.6 to 2 oxirane groups per molecule selected from the group characterized by the formula:

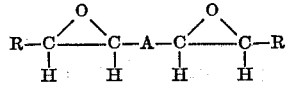

wherein A is a divalent organic radical selected from the group consisting of
(1) 2 to 4 continuously linked atoms,
(2) diester groups of a dicarboxylic acid having the carboxylic acid groups attached to adjacent carbon atoms of the acid.
(3) a dialkyl ether of a dihydric compound having the ether groups attached to adjacent carbon atoms of the dihydric compound, and R, which may be the same or different, is hydrogen or an alkyl radical containing up to 16 carbon atoms in the presence of a catalytic amount of a composite catalyst consisting essentially of an organometallic compound of the formula Y—M—Y wherein M represents zinc or cadmium and Y, which may be similar or dissimilar, is selected from the group consisting of a monovalent hydrocarbon radical, hydrocarbyloxy, or a halogen radical selected from the group consisting of chlorine, bromine or iodine; a compound selected from the group consisting of polar organic nitro-, nitroso-, azoxy, amine-, thiol and aliphatic sulfoxide compounds containing less than 18 carbon atoms; and water at a temperature of from 0 to 150° C.

2. A process as in claim 1 wherein the diepoxide compound is a diglycidyl polyether of a dihydric phenol.

3. A process as in claim 1 wherein the catalyst consists essentially of an organometallic compound of the formula Y—M—Y wherein M represents zinc, and Y, which may be similar or dissimilar, is a monovalent hydrocarbon radical; and a combination of an amine and water in the combined ratio of 0.1 to 1.4 moles per mole of organometallic compound.

4. A process as in claim 1 wherein at least one R is hydrogen.

5. A polycarbonate polymer consisting essentially of recurring structural units of the formula

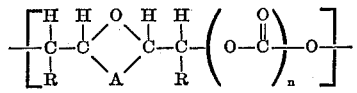

wherein A is a divalent organic radical from the group consisting of
(1) 2 to 4 continuously linked atoms
(2) diester groups of a dicarboxylic acid having the carboxylic acid groups attached to adjacent carbon atoms of the acid, and
(3) a dialkyl ether of a dihydric compound having the ether groups attached to adjacent carbon atoms of the dihydric compound; and R which may be the same or different, is hydrogen or an alkyl radical containing up to 16 carbon atoms, $n$ is 0 or 1, $n$ is 1 in 25 to 99% of the recurring units, and having an inherent viscosity in the range from about 0.01 to about 7.

6. A polymer as in claim 5 wherein A contains a hetero atom selected from nitrogen, oxygen, phosphorus and sulfur.

7. A polymer as in claim 5 wherein A is 2 to 4 continuously linked carbon atoms.

8. A polymer as in claim 5 wherein A is an ortho diester of an aromatic dicarboxylic acid.

9. A polymer as in claim 5 wherein $n$ is 1 in more than about 50% of the recurring units.

10. A process as in claim 1 wherein A contains a hetero atom selected from nitrogen, oxygen, phosphorus and sulfur.

References Cited
UNITED STATES PATENTS

| | | | |
|---|---|---|---|
| 2,994,705 | 8/1961 | Crosby et al. | 260—340.2 |
| 3,135,706 | 6/1964 | Vandenberg | 260—2 EP |
| 3,337,511 | 8/1967 | Matsuura et al. | 260—78.4 EP |
| 3,248,415 | 4/1966 | Stevens. | |
| 3,585,168 | 6/1971 | Shohei Inoue et al. | |

WILLIAM H. SHORT, Primary Examiner

T. E. PERTILLA, Assistant Examiner

U.S. Cl. X.R.

46—1; 106—3, 10; 167—85; 117—161 ZB; 252—9; 260—2 EP, 18 EP, 30.4 R, 77.5 D, 239 R, 327 R, 338, 340.2, 346.1 R, 463